United States Patent [19]

Lin

[11] Patent Number: 4,635,746

[45] Date of Patent: Jan. 13, 1987

[54] TIMING CORRECTION METHODS FOR SEISMIC ENERGY SOURCE OPERATION

[75] Inventor: James J. Lin, Plano, Tex.

[73] Assignee: Atlantic Richfield Company, Los Angeles, Calif.

[21] Appl. No.: 619,099

[22] Filed: Jun. 11, 1984

[51] Int. Cl.[4] .............................................. G01R 1/38
[52] U.S. Cl. .................................... 181/107; 181/110; 367/23; 367/55
[58] Field of Search ............... 181/107, 110, 120, 115; 367/23, 13, 50, 21, 55, 26, 27

[56] References Cited

U.S. PATENT DOCUMENTS

| | | | |
|---|---|---|---|
| 3,185,249 | 5/1965 | Shanks et al. | 367/55 |
| 3,866,161 | 2/1975 | Barr, Jr. et al. | 367/21 |
| 4,476,550 | 10/1984 | Ziolkowski et al. | 367/23 |

Primary Examiner—Thomas H. Tarcza
Assistant Examiner—Ian J. Lobo
Attorney, Agent, or Firm—Albert C. Metrailer

[57] ABSTRACT

A method for determining the effective or apparent firing time of a seismic source. The seismic detectors positioned at known distances from the source, but outside the non-linear acoustic region, are used to detect arrivals of energy from the source. The arrival times and known distances are used to determine effective source firing time which is in turn used to calibrate the source for actual seismic operations.

3 Claims, 2 Drawing Figures

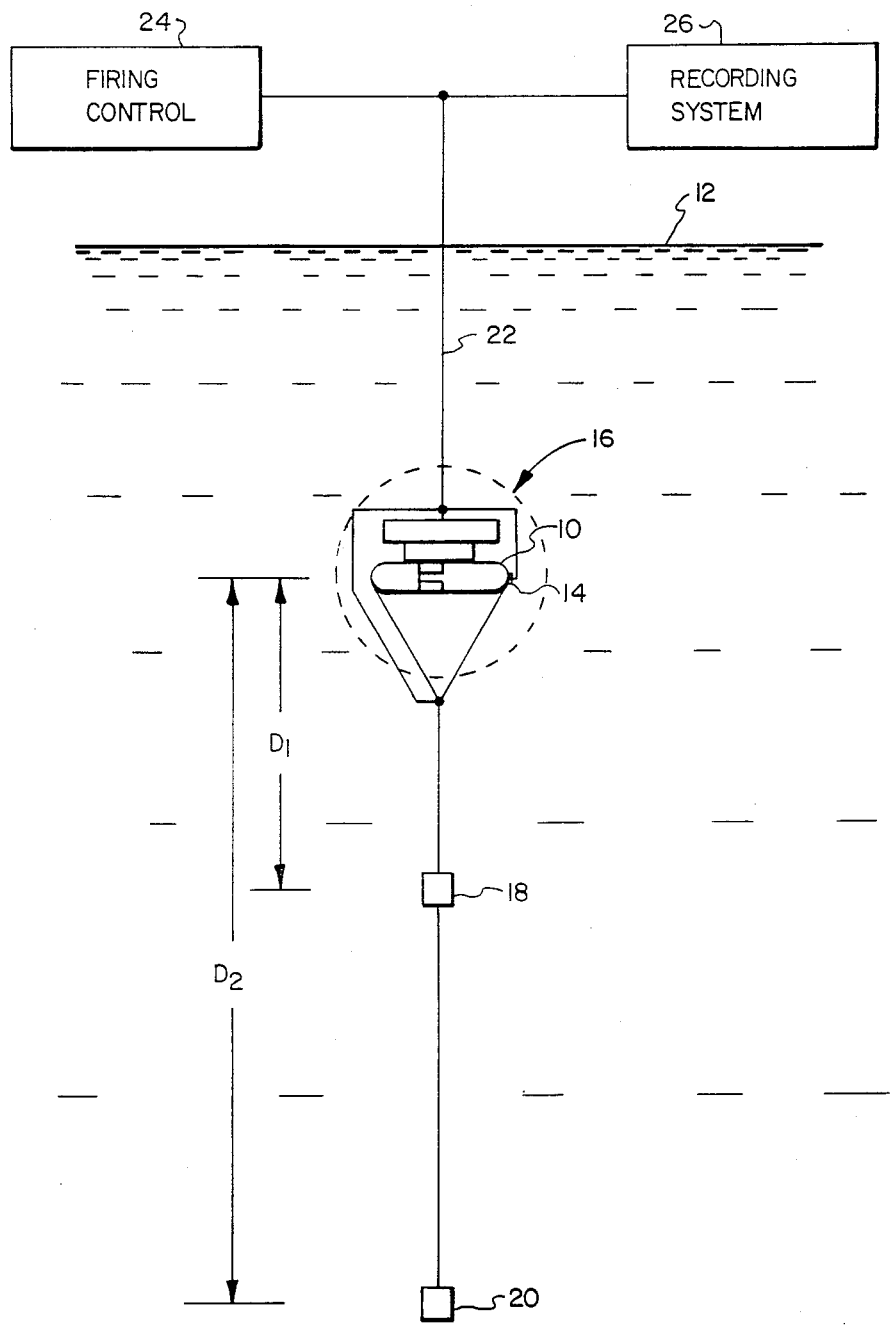
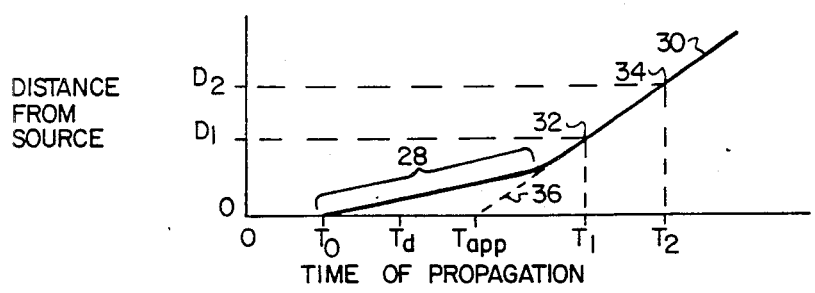

TIMING CORRECTION METHODS FOR SEISMIC ENERGY SOURCE OPERATION

BACKGROUND OF THE INVENTION

The present invention relates to methods of geophysical exploration and more particularly to a method for determining the apparent or effective time break or firing time of a seismic source.

Basic geophysical exploration techniques are well-known. In general, some type of geophysical source is coupled to the earth so that, when it is activated, it initiates an acoustic wave which travels downward into the earth. Portions of the acoustic wave are reflected by subsurface interfaces and travel back towards to the earth's surface where they are detected by geophones, hydrophones or the like. The signals received from the geophone are recorded and processed by computers to produce seismic sections which represent the subsurface structure of the earth.

This exploration process can be improved if the precise firing time of the source is known. For example, the depth to the subsurface interfaces is determined by estimating acoustic velocity and measuring the travel time of acoustic waves from the source to the receiver. The travel time can be precisely measured only if the time of initiation is precisely known. In many modern exploration techniques, especially marine operations, linear or even two-dimensional arrays of sources are fired simultaneously to provide directivity to the acoustic wave and for other reasons. To achieve the results desired from such source arrays, it is essential that all of the sources actually be fired at the same time.

It is well-known that source firing time cannot be determined from the driving signal, usually electrical, used to fire or activate the seismic source. Every source has inherent time delays between receipt of the triggering signal and the actual initiation of the acoustic wave. As a result it is standard practice to equip seismic sources with detectors which respond to the actual acoustic wave generated. This time break signal is commonly recorded along with other data used in the various processing steps. This signal is also often used to determine the time delay between the firing signal and actual initiation of the acoustic wave. This time delay can then be used to adjust the firing signals to improve synchronization of sources which are fired as arrays.

While use of a source mounted detector to provide a time break signal provides improved results, it cannot avoid another source of error. In the region immediately surrounding the seismic source, the acoustic wave energy is usually so high that the wave travels in a non-linear manner. This region may extend only a distance of one foot from the source for small sources, but may extend as much as ten to twenty feet from the source for larger sources. Wave travel in the far field acoustic region beyond the non-linear region is uniform and predictable. Travel times measured from the time break signal received from a source mounted detector therefore include travel time through the non-linear region as well as the far field region. The non-linear velocities of the acoustic wave in the non-linear region are quite difficult to correct for, and introduce uncertainty as to the effective location of the source as seen from the far field region. Where arrays of multiple sources are used, variations in the non-linear region can time shift the effective firing location or time of the sources and thereby reduce the effectiveness of the source array. This is complicated further by the fact that source arrays often include sources of varying sizes each of which therefore has a different non-linear region even when they are all fired in a uniform medium such as sea water.

SUMMARY OF THE INVENTION

Accordingly, it can be seen that it would be desirable to have a method for determining the apparent or effective firing time of a seismic source as seen from the far field region.

According to the present invention, effective or apparent source firing time is determined by measuring the times of first arrivals of the acoustic wave at two detectors spaced at known distances from the acoustic source but located outside the non-linear region. Based on these times of arrival and the known spacing, the apparent source initiation time can be determined. In a preferred embodiment, a source mounted detector is also employed and a correction factor is determined based on the difference between the time break signal determined from the source mounted detector and the measured apparent initiation time and this correction factor is thereafter used to improve the accuracy of seismic operations using the particular seismic source, whether used individually or as part of a larger array.

BRIEF DESCRIPTION OF THE DRAWINGS

The present invention may be better understood by reading the following detailed description of the preferred embodiment with reference to the accompanying drawings wherein:

FIG. 1 is a schematic and block diagram illustrating the arrangement of a seismic source and detectors used in the method of the present invention; and FIG. 2 is a time versus distance plot of acoustic wave travel from a seismic source illustrating the method of determining apparent initiation time according to the present invention.

DESCRIPTION OF THE PREFERRED EMBODIMENT

With reference now to FIG. 1 there is illustrated a simplified source and detector arrangement for determining apparent source firing time according to the present invention. In FIG. 1 a seismic source 10, for example an air gun, is shown suspended below the surface 12 of sea water. A source mounted detector 14 is illustrated connected directly to the source 10. A non-linear acoustic region surrounding source 10 is illustrated schematically by the dashed line circle 16. A first far field seismic detector 18 is illustrated suspended at a first distance $D_1$ below source 10 but outside the non-linear region 16. Likewise, a second seismic detector 20 is illustrated suspended a second known distance $D_2$ below source 10 and therefore even further from the non-linear region 16. A multi-conductor and conduit cable 22 provides mechanical support and electrical and air supply connections to the source 10 and detectors 14, 18 and 20. The cable 22 extends above the surface 12 of the water where it is connected to a firing control unit 24 and a recording system 26. Systems 24 and 26 may be conventional units as are normally used in seismic field operations. For example, firing control 24 may supply the energy source, for example compressed air, to source 10 and may provide the firing command either electrically or pneumatically to activate source 10. Recording system 26 records the time of the firing signal generated by control 24 and also records the outputs of detectors 14, 18 and 20. The time differences between the first arrival or time break of the various recorded signals together with the known distances between the source 10 and detectors 18 and 20 may then be used, as explained in more detail below, to determine the effective firing time of source 10. In a preferred form, this effective time is then compared to the time break signal from source mounted detector 14 to determine a correction factor for the particular source 10 being tested.

As suggested above, the method of the present invention is quite simple to perform after the equipment is set up as illustrated in FIG. 1. The firing control 24 is used to activate source 10 and recording system 26 is used to record the time of the source firing signal, the time break signal received from source mounted detector 14 and the outputs of detectors 18 and 20. It is preferred that this sequence of steps be repeated a large number of times to prove the repeatability of the source and to establish the accuracy of a correction factor. In preliminary experiments testing the present invention individual sources were fired on the order of one hundred times each.

Determination of the apparent or effective source firing time is illustrated graphically in the plot of FIG. 2. In FIG. 2, the propagation of the acoustic signal from source 10 is illustrated in a time versus distance plot. This plot includes a non-linear portion 28 followed by a linear or far field portion 30. The non-linear portion 28 begins at time $T_0$ when the firing of source 10 begins. As indicated, $T_0$ occurs at some time delay after the generation of the firing signal by control 24, which may occur for example at the zero point on the time scale. The source mounted detector 14 provides a time break signal indicated as $T_d$ which is delayed to some extent after $T_0$. The first arrivals of the acoustic wave at detectors 18 and 20 are indicated by times $T_1$ and $T_2$ which occur within the linear region 30 of the wave travel plot. The positions of detectors 18 and 20 are indicated as $D_1$ and $D_2$ on the distance scale. In actual practice of the present invention, there is not sufficient information to accurately plot the non-linear portion 28 of the curve. The recorded data instead provides the location of points 32 and 34 on curve 30. By plotting these two points and extrapolating the curve as indicated by the dotted line portion 36 back to the zero distance position, the apparent or effective time of source firing, $T_{app}$, may be graphically determined. Thereafter the time delay between $T_d$ and $T_{app}$ can be graphically determined and used as a correction factor. Our experimental results indicate that this correction factor is quite repeatable and consistent for a given source fired under the same conditions, for example a particular air gun fired at the same pressure.

The determination of $T_{app}$ may be mathematically stated by the following equation:

$$T_{app} = T_1 - \frac{D_1(T_2 - T_1)}{D_2 - D_1}.$$

As suggested above the basic correction factor provided by the present invention is the time difference between the timebreak signal, $T_d$, provided by the source mounted detector 14 and the apparent firing time, $T_{app}$. It is also possible to determine the total time difference between generation of the firing signal by control 24 and $T_{app}$. This total time difference can then be used to adjust the firing signal timing so that apparent firing time of a source occurs at a preselected firing time without reference to $T_d$ during actual operations. This is particularly important when multiple sources are to be fired simultaneously or at known time delays. However such a procedure will not be preferred in most operations for several reasons. Conventional practice now includes use of the source mounted detector 14 and this can be expected to continue. The time delay between generation of the firing signal by control 24 and actual firing of source 10 is affected by wear on the components of source 10 and can be expected to drift during use. In contrast, I believe that the time delay caused by the non-linear propagation region remains fairly constant, at least in marine operations. Therefore, the preferred procedure is to establish, prior to actual operations, a fixed correction factor for the non-linear propagation region, but to continually update the correction for time delay between the firing signal and the timebreak signal $T_d$. For example, on a given shot the firing signal may be generated by control 24 at a time preceding a preselected firing time by the sum of the fixed correction factor, $T_{app} - T_d$, and the time delay between generation of the firing command and the timebreak signal, $T_d$, on the immediately preceding shot. Known techniques for providing a running or weighted average of some number of preceding time delays may be used to smooth the process if desired.

The present invention was tested in New Port Harbor, R.I. Sources which were tested included air guns sold under the designations 600B, 1900C and 1500C by Bolt Technology Corporation of Norwalk, Conn. The air guns which were tested had chamber sizes stated in cubic inches as follows: model 600B, 20, 30 and 40; model 1900C, 30, 40, 60, 70, 80, 90, 100, 110, 120, 140, 160, 180, 200 and 250; and model 1500C, 220, 240, 270, 300 and 340. Source mounted detector 14 were model SSIII accelerometers manufactured by Input/Output Inc. of Houston, Tex. Detectors 18 and 20 were hydrophones sold as model Reftek 17 by Refraction Technology, Inc. of Dallas, Tex. The sources were suspended at a depth of thirty-five feet below the water surface 12 and the spacings $D_1$ and $D_2$ of detectors 18 and 20 were twenty-five and fifty feet respectively. Water salinity and pressure were measured at five foot depth increments to determine homogeneity of the sea water at the test location and a variation of only 0.11 percent was measured. As indicated above, each source was fired at least 100 times at 2000 pounds per square inch pressure to determine consistency and repeatability of the source and detectors. For the model 600B, 20 in$^3$ air gun a mean correction factor ($T_{app} - T_d$) of 3.5916 ms was measured with a standard deviation of 0.0035 ms. The model 1900C, 100 in$^3$ gun had a mean correction factor of 4.1204 ms with a standard deviation of 0.0029 ms. The model 1500C, 270 in$^3$ gun had a mean correction factor of 3.2800 ms with a standard deviation of 0.0027 ms.

The results of the tests indicated that the time delay caused by the non-linear regions is repeatable for a given source operated at given conditions so that a correction factor can be determined for each individual source. We therefore believe that in field operations using the calibrated sources it will not actually be necessary to provide the detectors 18 and 20 for determining the effective firing time upon each firing of the source. This can be done if desired and could provide improved accuracy in operations using a single source 10. This is not believed practical where multiple sources are fired in an array, since failure to synchronize the effective firing times of the sources in the array will degrade the performance, for example bandwidth and directional characteristics, of the array and this performance cannot be corrected by later processing. I therefore believe that the best use of the correction factors determined by the present invention is in calibrating firing control 24 to provide an activation signal to source 10 sufficiently in advance of the desired firing time so that the apparent firing time as seen from the far field region will be precisely at a preselected required firing time.

While the present invention has been illustrated with respect to marine operations, I believe it can also be applied in land operations. Thus, a given type of land source, for example an explosive charge, may be calibrated by positioning geophones 18 and 20 in shot holes positioned at known distances from an explosive charge. In similar fashion, the present invention may be applied to other types of sources such as water guns, mechanical impactors and mechanical vibrators.

While the present invention has been illustrated and described with respect to particular apparatus and methods of use, it is apparent that other changes or modifications therein may be made within the scope of the present invention as defined by the appended claims.

What is claimed is:

1. A method for measuring the effective firing time of a seismic source comprising:
    placing first and second seismic detectors in the propagation medium in which the source is positioned at first and second distances from said source, both said first and second distances being selected to be beyond a non-linear propagation region surrounding said source,
    connecting a third detector to said source for providing a time break signal indicating source firing time,
    detecting the times of arrivals of energy from said source at said first, second, and third detectors,
    using the times of arrivals at said first and second detectors and said first and second distances, calculating the effective firing time of said source, and
    calculating the time difference between the third detector time break signal and the effective firing time determined from said first and second seismic detectors, said time difference being a correction factor.

2. The method according to claim 1 further including the step of using said seismic source and said third detector in seismic exploration operations and using said correction factor to correct time break signals received from said third detector to indicate the effective firing time.

3. A method according to claim 1 further including the step of using said seismic source and said third detector in seismic exploration operations where said source is to be fired at preselected times, further including the steps of:
    providing a firing signal to said source at a known time, and
    measuring the time delay between the time break signal received from said third detector and said known time and using said firing time delay and said correction factor to adjust the timing of subsequent firing signals so that upon subsequent source firing the effective firing time corresponds to said preselected firing time.

* * * * *